May 31, 1932. H. R. ANSEL 1,860,919
SIGN STRUCTURE
Filed May 10, 1930   3 Sheets-Sheet 1

INVENTOR.
HARRY R. ANSEL.
BY
ATTORNEY

May 31, 1932.  H. R. ANSEL  1,860,919
SIGN STRUCTURE
Filed May 10, 1930   3 Sheets-Sheet 2

INVENTOR.
HARRY R. ANSEL.
BY
ATTORNEY

May 31, 1932. H. R. ANSEL 1,860,919
SIGN STRUCTURE
Filed May 10, 1930 3 Sheets-Sheet 3
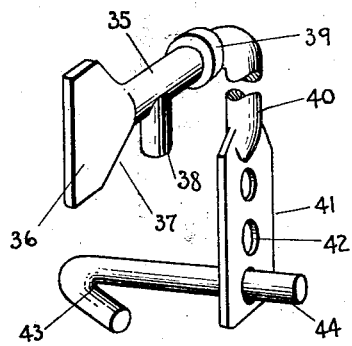
Fig. 13
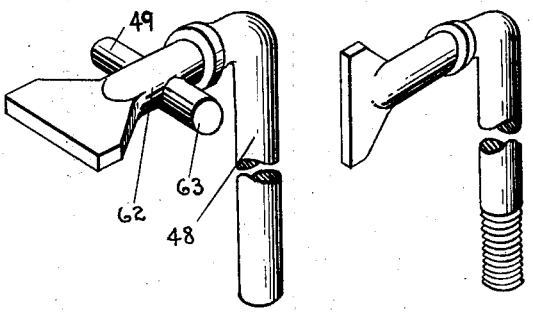
Fig. 14 Fig. 15
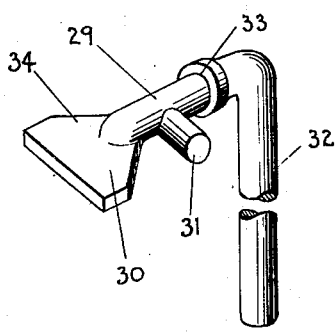
Fig. 16
Fig. 17
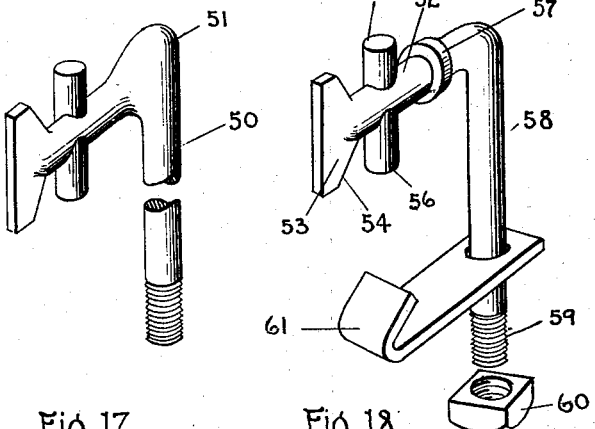
Fig. 18
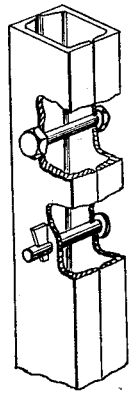
Fig. 19
INVENTOR.
HARRY R. ANSEL
BY
ATTORNEY Patented May 31, 1932

1,860,919

UNITED STATES PATENT OFFICE

HARRY R. ANSEL, OF COLUMBUS, OHIO

SIGN STRUCTURE

Application filed May 10, 1930. Serial No. 451,433.

My invention relates to sign structures. It has to do, more particularly, with poster panel and bulletin structures, although it is not necessarily limited thereto.

In the prior art, sign structures have taken various forms. In one form, it has been customary to construct the sign structure from a plurality of units. Quite frequently, these units have been made of a wooden framework with galvanized sheets nailed thereto. One of the difficulties encountered with units of this type is that the wooden framework has a tendency to warp and rot. The warping of the framework makes it impossible to keep a flush joint between adjacent units so as to present a smooth surface upon which signs may be either pasted or painted. Furthermore, where the sheets are nailed to the framework, corrosion arises at the nail holes. In addition, the nail heads protruding from the sheet make it difficult to scrape off old posters. These drawbacks increase the necessity for replacing wornout panels and, therefore, increase the cost of maintenance.

In other prior art devices, difficulty has been found in producing air-tight and water-tight joints between the units or sections used to make up the complete structure. Where this occurs, wind or rain blowing through such joints increases the difficulty of applying paper signs to the structure and, also, tends to loosen and destroy such paper signs when they are applied.

One of the objects of my invention is to provide a sign structure that may be made up of one or more sections that may be easily and quickly assembled and, when assembled, will have a maximum rigidity and a minimum weight.

Another object of my invention is to provide a sign structure made up of a plurality of units or sections which are of such a structure and so assembled that the joints between the sections will be entirely weathertight so as to prevent wind and rain blowing through from the rear with consequent annoyance during posting and tendency of the poster sheets to loosen after they have been applied.

Another object of my invention is to provide a sign structure which will have a face entirely free from nail heads, and will be otherwise smooth so that corrosion will be avoided and old posters may be conveniently scraped therefrom.

Another object of my invention is to provide a sign structure which may be made and assembled with a minimum of expense and which will, nevertheless, have a long life.

A further object of my invention is to provide a means for fastening the sections and units together and a means for fastening the metal sheeting upon the framework without the necessity of using a number of parts and tools to accomplish this result.

My invention preferably takes the form of a sign structure which may be constructed of one or more units. Each unit is substantially complete in itself and comprises a skeleton framework with a sheet metal element superimposed thereon, means being provided to initially support the sheet metal element upon its framework and this element being finally secured to this framework in such a manner as to avoid projecting edges which might be injured in shipping. When a plurality of units are used, my invention contemplates the provision of simple and effective means for connecting the units to a main skeleton framework of the sign structure. It also contemplates the provision of a simple and effective means for securing the units or sections together in such a manner as to render the joints between them weathertight. Other advantageous features of this invention will appear in the more detailed description which follows.

The preferred embodiment of my invention is shown in the accompanying drawings wherein similar characters of reference designate corresponding parts and wherein:

Figure 13 is a perspective view, partly broken away, of the preferred form of key shown in Figures 3 and 5 with a means for attaching the key and, therefore, adjoining sections to the main framework of my sign structure.

Figure 14 is a perspective view, partly broken away, of a key which may be used for connecting the sections together intermediate the stringers of the main framework.

Figure 15 is a perspective view, partly broken away, showing a modification of the key shown in Figure 7.

Figure 16 illustrates the form of key shown in Figure 3 for securing the sections together at points intermediate the cross bars of the main framework.

Figure 17 is a modification of the key structure shown in Figure 7.

Figure 18 is a perspective view of the modified form of key shown in Figure 6 with the means for attaching the key and, therefore, adjoining sections to the main framework of my sign structure.

Figure 19 is a perspective view, partly broken away, showing two means which may be used for securing the sections together at points intermediate the cross members of the supporting structure.

Figure 2:
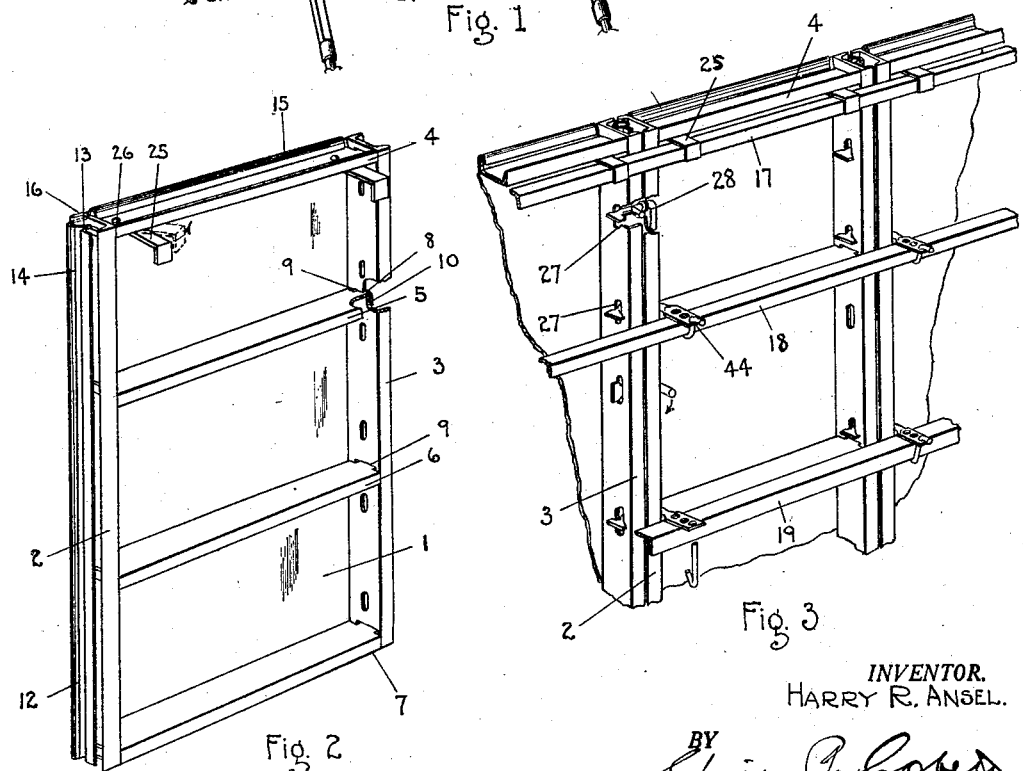
Figure 2 is a perspective view of one of the sections or units which are designed to be mounted upon a supporting framework to produce a sign structure.

With reference to Figure 2 of the drawings, I have shown a section or unit comprising a sheet metal panel structure 1 and a skeleton framework constructed of vertical channel members 2 and 3 and a plurality of horizontal channel members 4, 5, 6 and 7. The cross channel members 4, 5, 6 and 7 are preferably connected to the vertical channel members by tongue and groove joints.

Each cross channel member has a tongue member 8 formed on each end thereof which is adapted to extend through horizontal slots 9 disposed in the channel members 2 and 3. The ends of the tongues are bent over as at 10 when the skeleton framework is in assembled position to securely hold the horizontal channel member to the vertical channel members.

In this structure, the upper cross channel member 4 is preferably upturned to facilitate the attachment of the sheet metal panel thereto in a manner that will be described. It might be said at this point, however, that the top of this channel is designed to be ultimately covered with a molding 11 (Figure 1) in the completion of the sign structure, so that collection of moisture therein is avoided. The cross channel members 5, 6 and 7 are all downwardly turned so that they will readily shed moisture, and to avoid the collection of moisture thereon. The vertical channel members 2 and 3 preferably have their toes outwardly turned, as indicated in Figure 2.

It will be seen that these members 2, 3, 4, 5, 6 and 7 form a skeleton framework. This skeleton framework is designed to receive a sheet metal panel whose body portion is indicated at 1 and which is preferably formed, before application to the skeleton framework, with vertical edges reversed as at 12 to embrace the forward toes of the channel members 2 and 3, as indicated in Figure 2. These reversed portions 12 extend into close juxtaposition to the webs of the vertical channel and are again reversed, as at 13 in Figures 2 and 3. These reversed portions 13 extend outwardly so that they form a V with the portions 12. These portions 13 extend only slightly beyond the vertical edges of the body portion 1 of the panel structure. At their extremities, these members 13 are provided with rearwardly turned flanges 14.

Each panel structure 1 is applied to its skeleton framework by sliding its inturned edges over the forward toes of the vertical channel members 2 and 3. Each panel member 1 is of greater height than the skeleton framework and, after the panel is in proper position upon the skeleton framework, its horizontal edges are turned into position to embrace the forward toes of the upper and lower cross members 4 and 5, as illustrated at 15 in Figure 2. The corners of the panel structure are preferably cut away as at 16 to facilitate the production of a clean joint at the corners. It will, of course, be understood that the sheet metal panel may be applied to the skeleton framework by springing the vertical channel members or by placing the panel on the skeleton member and bending these vertical edges into embracing relation with such forward toes.

When these sections or units have been provided by combining the skeleton framework thereof with the sheet metal panel, they are ready for use in the construction of a sign. If the sign is to include a plurality of units or sections, these units or sections are preferably mounted side by side upon a structural framework, although a plurality of superimposed rows may be used. This structural framework may take various forms but it preferably comprises a series of horizontally disposed spaced stringers such as shown at 17, 18 and 19 in Figures 1 and 3 of the drawings. These horizontal stringers may be supported and braced in any desired manner. In the form shown in Figure 1, they are bolted to the vertical posts 20 which are connected to inclined legs 21 by means of diagonal braces 22. A plurality of legs 21 are preferably used and these are held together by a substantially horizontal cross bar 23 and inclined cross braces 24.

The preferred manner of applying my sections to my supporting framework contemplates the initial hanging of the sections upon the framework. This is preferably followed by the connection of the sections to each other and then by the securing of the connected sections rigidly to the cross bars of the framework.

Figure 1:
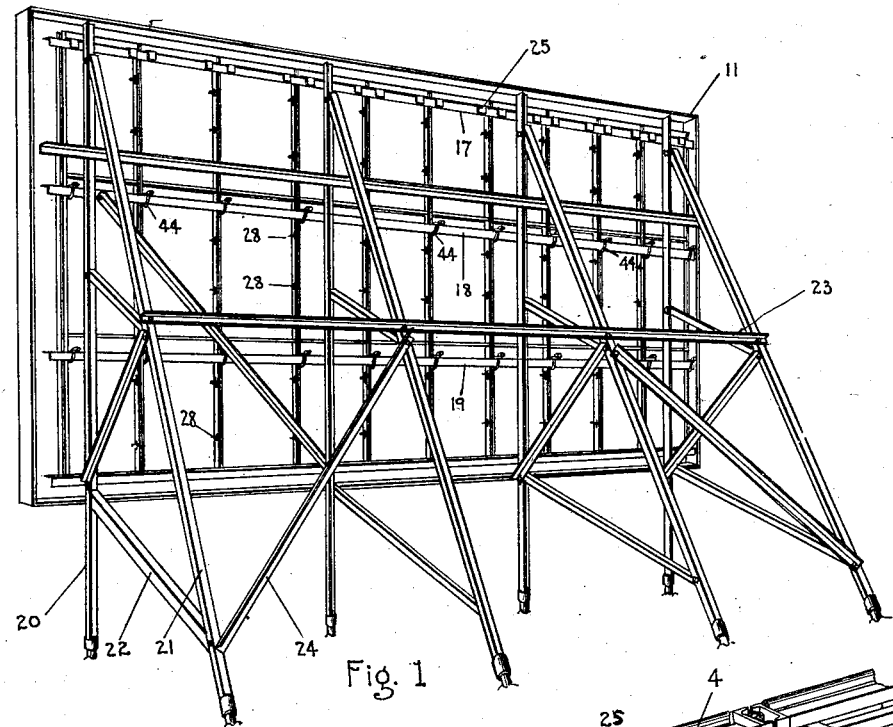
Figure 1 is a perspective view of an assembled sign structure showing the rear view thereof.
Figure 3:
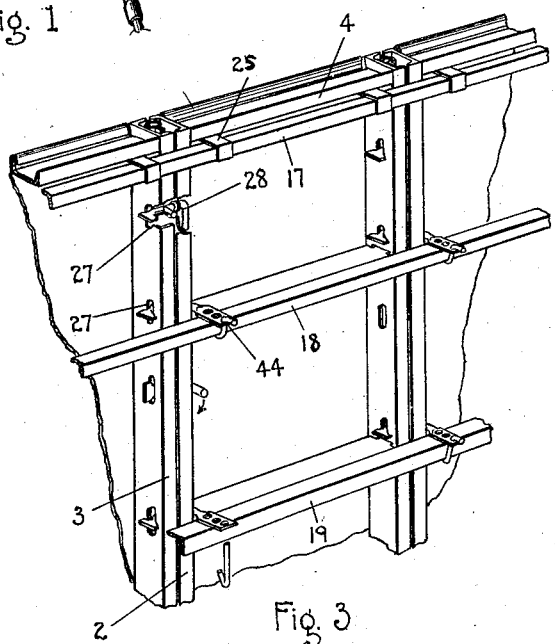
Figure 3 is a perspective view of a portion of a sign structure, illustrating particularly the rear construction thereof.

I have provided a simple means for hanging the sections upon the supporting framework. As shown in Figures 1, 2 and 3 this means comprises the provision on each section of pivotally mounted hook members 25. It will be seen that these hanging devices take the form of flat strips of metal which are pivotally connected as at 26 to the under side of the upper channel member 4 of each section. The outer ends of these flat strips are preferably down-turned at right angles to the main body portion thereof at such a line that they will firmly embrace the stringer 17 and hold each section snugly in contact therewith. These hook-like members are so pivoted to the channel members 4 of the sections that they may be swung into position beneath these channel members 4, being of such width that they fit beneath these channel members without protrusion therebeyond. This facilitates the shipment of the sections without injury to the hook-like members.

Figure 4:
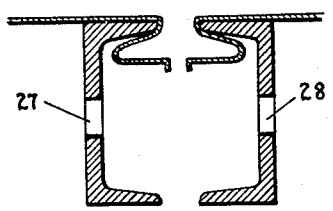
Figure 4 is a detail in section illustrating the preferred manner in which the metal sheeting of each section or unit embraces the vertical channel members of each unit or section, this figure showing the vertical edges of adjacent sections spaced apart to more clearly illustrate the structure.
Figure 5:
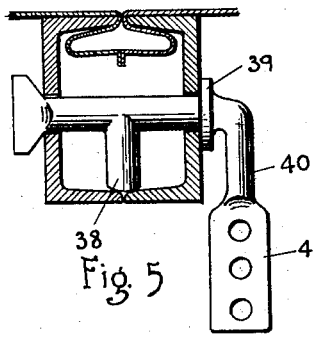
Figure 5 is a detail in section of the structure shown in Figure 4 but with the vertical edges of the sections in their proper relation and with the preferred form of securing clamp in position.
Figure 6:
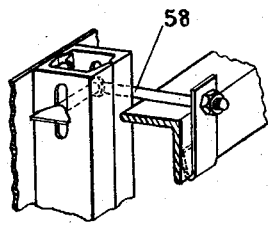
Figure 6 is a perspective view in section of a modified key structure for securing the sections to each other together with a means for securing the key to the supporting framework.
Figure 7:
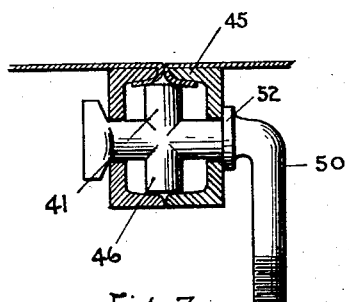
Figure 7 is a detail in section illustrating a modified form of joint between my units or sections and the modified form of key shown in Figure 6.

After these units or sections have been hung upon the supporting framework, they are secured together by means of keys of special form projecting through each pair of abutting vertical channel members. This is illustrated best in Figures 3, 5 and 7. For instance, in Figure 4, adjacent sections are shown slightly separated along their vertical edges and Figure 5 shows the same sections when they have been moved into abutting relation with the key applied therethrough.

From these figures, it will be noted that the vertical channel members of the sections are provided at regular intervals with aligning slots 27 and 28. The key which I preferably use is illustrated in Figures 3 and 16. In these figures, it will be seen that the key comprises a shank 29 of cylindrical form, this shank having a fan-shaped extremity 30. On one side of this cylindrical shank 29 there is also provided a laterally extending cylindrical lug 31. The shank is preferably provided with a handle 32.

To render these keys effective, they are turned to such a position that their fan-shaped extremities may be passed entirely through both of the aligning slots 27 and 28, until the shoulders 33 at the base of the shanks 29 are firmly in contact with the face of the adjacent channel members. Then, each key is turned until it assumes a position in which the fan-shaped extremity thereof extends at right angles to the line of extension of said slot. In this position, the inclined edges 34 of these fan-shaped extremities exert a cam action upon the adjacent face of the channel member and this serves to tightly draw the channel members into contact with each other, which at the same time forces the flanges 14 of adjacent panels firmly into contact with each other.

Movement of these keys to this position also causes the cylindrical lug 31 to firmly abut the rear toes of the channel members. This serves to register the channels and, therefore, maintain the faces of the sections in the same plane.

Intermediate the slots 27 and 28 and the keys just described are somewhat similar key members which are constructed to cooperate with means for securing the sections to the supporting framework. The preferred form of key which I use to connect the sections to each other and to the stringers is shown in Figure 13. It comprises a shank 35 having a fan-shaped end 36 with inclined edges 37 and one radially extending cylindrical lug 38. At the base of the shank 35 it is provided with a shoulder 39 which also forms the inner end of a handle member 40. The handle member 40 which is connected to the stringer is preferably flattened as at 41 and provided with spaced apertures 42. This flattened portion is intended to rest upon the upper horizontal portion of the stringer and to project rearwardly beyond the same. It is connected with this stringer by means of a hook member 43 which hooks under the vertical edge of the angle iron which constitutes the stringer. The upper end of this member 43 may be extended through one of the apertures 42 and bent over as at 44, see Figure 3. One advantage of this particular form of key is that it may be readily secured to wooden stringers by passing nails or similar devices through the apertures 42 and into the wooden stringer.

The manner in which these last-named keys are effective to hold the sections together and to also secure them to the supporting framework is illustrated in Figure 3. In this position, the inclined edges 37 are exerting a cam action upon the adjacent face of the channel member so that the abutting channel members are gripped firmly between these inclined edges 37 and the shoulder 39 and so that the channel members and the overhanging panel structures are firmly pressed together. In this position the cylindrical lugs 38 are firmly in contact with the rear toes of the vertical channel members and in overlapping relation to the joint between these rear toes. In this position of the keys, their handles 40 project horizontally in a rearward direction and engage the hook-like members 43. These hook-like members are vertically disposed and their hook portions hook over the vertical edge of these stringers 18 and 19. In this position, the upper end of the hook-like member is bent over as at 44 (Figure 3) to firmly draw the sections against the stringers.

Figure 8:
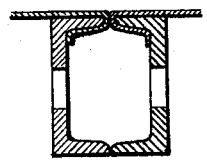
Figure 8 is a detail in section illustrating a modified form of joint between my units or sections.
Figure 9:
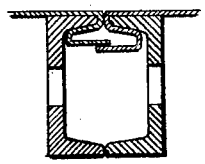
Figure 9 shows another form of joint between my units or sections.
Figure 10:
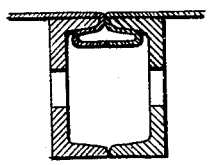
Figure 10 is a detail in section of another modified form of joint between my adjacent units or sections.
Figure 11:
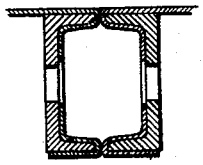
Figure 11 is a detail in section showing a further modified joint structure wherein the edges of my panels are bent to almost completely embrace the vertical channels of the units.
Figure 12:
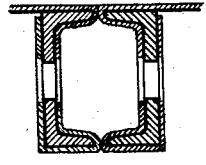
Figure 12 is a detail in section illustrating the modified joint structure in which the edges of the sheet metal panels are bent to almost completely embrace the vertical channels of my units or sections.

In Figures 7, 8, 9, 10, 11 and 12, I have shown the reversed vertical edges of the sheet metal panels extended to various degrees and formed in various manners. Thus, in Figure 7 these reversed portions embrace the forward toes of the vertical channel members as at 45 and are gripped firmly between these abutting forward toes. The extremities of these edges terminate just short of the web of the channels. As shown, they may be securely held in position by abutment of cylindrical lugs on keys such as shown at 45 and 46 in Figure 7. In Figure 8, the extremities of the channel embracing edges of the vertical panels, extend to the web of these vertical channels and thence for a short distance along such web. In Figure 9, the channel embracing edges of these panels extend to the web of the channel and then extend reversely into overlapping relation with each other. In Figure 10, the channel embracing edges of these sheet metal panels extend to the web of the channels and are then reversed until their edges are in substantially abutting relation. In Figures 11 and 12, the channel embracing edges of the sheet metal panel embrace the vertical channel members for a substantial part of their areas, being provided with openings in alignment with the slots in these vertical channel members so that the locking keys may be passed therethrough.

I have shown several modified forms of keys that may be substituted for the keys shown in Figures 13 and 16 which have hereinabove been described. For example, in Figure 14 I have shown a key member 48 of the type shown in Figure 16 wherein horizontal lugs 49 and 63 are formed diametrically opposite to each other on the shank 62. Figure 17 shows a still different form of key which may be used for connecting the sections and the stringer together. This key is designated 50 and is substantially similar to the key shown in Figure 7. The principal difference is that a cam shoulder 51 (Figure 17) is substituted for the shoulder 52, to assist in drawing the vertical channels firmly into contact.

In Figure 18, I have shown a modified means for securing the sections together and to the stringer. This form of key is particularly useful in connection with the form of panel joint shown in Figure 7. It comprises a shank 52 having a fan-shaped end 53 with inclined edges 54 and two radially extending cylindrical lugs 55 and 56. At the base of the shank 52 it is provided with a shoulder 57 which also forms the inner end of a handle member 58. The handle member 58 is preferably threaded at its extremity as at 59 for the reception of a nut 60 which is designed to hold a hook-like strip 61 upon the handle 58. The clamp shown in Figure 15 is the same as that shown in Figure 18 with the exception that the cylindrical lugs which are formed on the shank have been omitted.

In Figure 19, I have shown two other ways in which the vertical channel members may be secured together. In one form, a bolt and nut construction is used, while in another form, a bolt and wedge key construction is used.

As shown in Figure 1 of the drawings, the upper horizontal edge of the sign structure is provided with a molding 11 which may, if desired, be extended to cover all four edges of the sign structure. It serves effectively to cover the upwardly open channel members 4 of the sections making up the sign structure, so that water will not collect in this channel and will not pass downwardly between the vertical channel members, where it might otherwise find its way to the front of the sign structure by capillary attraction.

From this description it will be seen that I have provided an extremely simple, efficient and cheap form of sign structure, though it will be understood that there are features herein capable of wider application. In the first place, the structure is such that the sections may be made of standard channel irons and metal sheets, while the supporting framework may also be made of standard material. The sheet metal panel portions are readily mounted upon the skeleton portions of the sections and, though the edges thereof maintain a resilient abutting relationship, these edges do not project to such an extent as to give rise to any material danger of distortment during shipment.

Furthermore, my sections are of such structure and so mounted in relation to each other that they are entirely weather-tight. For example, the wind and rain cannot sift through abutting edges of the sections which are held in contact by the compressive action of the cam-shaped keys. In addition to this, the box-like formation created by the facing of the channels towards each other produces a fairly large air space in the section joint so that any wind or rain entering the joint from the rear, that is, between the rear toes of the channels, has an opportunity to dissipate itself, lose its velocity and travel in directions other than straight through the section joint. As a matter of fact, it has been found by tests that this actually happens and that when air is applied on the joint from the rear, very little of this air emerges from the joint on the front. This is likewise true of the rain which might be driven into the section joint from the rear since, after entering between the rear toes of the channel it cannot be driven across the intermediate space to the front toes of the channel to wet the face of the section but will run down the channel and escape to the ground without doing any damage. As a matter of fact, our structures, particularly those shown in Figures 4, 5, 9 and 10 provide three point contact which even preclude the passage of light and consequently increase the salability of our sign structure.

Another advantage of my invention arises from the fact that my sections are complete and readily transportable and may if desired have signs painted thereon before assembly with assurance that they will properly register when assembled.

Another advantage of my structure is that my sections may be readily hung upon their supporting framework and then secured together and to the supporting framework at leisure, this securing action being further facilitated by the provision of unitary keys which may be applied with a minimum number of tools. As a matter of fact, the intermediate fastening keys are one piece members which require no tools of any kind for their application. None of the fastening keys can become loosened by vibration and fall out. Furthermore, these keys serve a number of functions, such as holding the vertical channels firmly together, maintaining these channels in proper registry, holding the sections firmly against the supporting framework. In addition, these keys exert a pressure upon the edges of the sheet metal panel portions and are effective to clamp these panel portions and hold them against wind pressure from the rear which might otherwise force the sheets from the channel frame.

My intermediate channel braces are effective to stiffen the vertical sides of each section and to absorb the blows of a paste brush when the men are posting paper signs on the structure. In addition to this, our channel cross pieces are down-turned so as to shed water, with the exception of the top cross piece whose channel portion is covered by the molding.

Another advantage of my invention resides in the fact that the sheet metal panel pieces are entirely free from nail heads or holes. This obviates all danger of corrosion at such points. Furthermore, there are no horizontal edges which tend to corrode and collect water.

A means for temporarily suspending the sections from the supporting framework, that is, the pivoted clips carried upon the upper channel member of each section are of such a nature that they can be turned back out of the way for shipment. Also, when in operation, these clips will support the sections on the framework, even though there is a substantial wind blowing from the back of the sign structure.

Having thus described my invention, what I claim is:

1. A panel section comprising a body portion and clips thereon pivoted to swing horizontally for temporarily suspending said body portion from a supporting framework during final connection of said sections to the supporting framework.

2. A panel section comprising a skeleton frame body portion, and clips thereon for temporarily suspending said body portion from a supporting framework during final connection of said sections to the supporting framework, said clips being adjustable to a position within the structure of said body portion.

3. A sign comprising a supporting framework, a plurality of independent complete panel sections each comprising a channel iron frame and a metal panel partly embracing the perimeter thereof, the adjacent side members of said frames being provided with openings adapted to be aligned, rotatable keys adapted to be passed through said openings and provided with collars adapted to engage said frames and also having wedge elements adapted to be rotated into engagement with the opposing frames to draw adjacent frames toward each other and means for supporting said panel sections on said framework.

4. A panel section comprising a skeleton body portion and rigid clips pivoted thereon to swing on their pivots to positions completely within the structure of said body portion to avoid obstruction in shipping, said clips serving as means for temporarily suspending said body portion from a supporting framework during final connection of said sections thereto.

5. A sign panel comprising a frame having a channel about its edge, a metal plate having a portion of its edge yieldingly seated in said channel and depressible therein.

6. A sign comprising a plurality of frames each having channels about its edges, a metal plate for each frame and having a portion of its edge yieldingly seated in said channel and depressible thereinto, and means for drawing said frames together to compress said plate edges into their respective channels.

7. A sign comprising a plurality of frames each having a channel about its edge, a metal plate having a portion of its edge partially embracing the perimeter of said frame and yieldingly seated in the channel therein but extending beyond said channel and depressible thereinto, and means for drawing said frames together to contact the embracing portions of the plates and to engage the extending portions to compress said plates into their respective channels and maintain yielding and compressing engagement.

In testimony whereof I hereby affix my signature.

HARRY R. ANSEL.